H. STENQUIST.
CLEAN OUT PLUG.
APPLICATION FILED APR. 18, 1914.
1,194,091.
Patented Aug. 8, 1916.
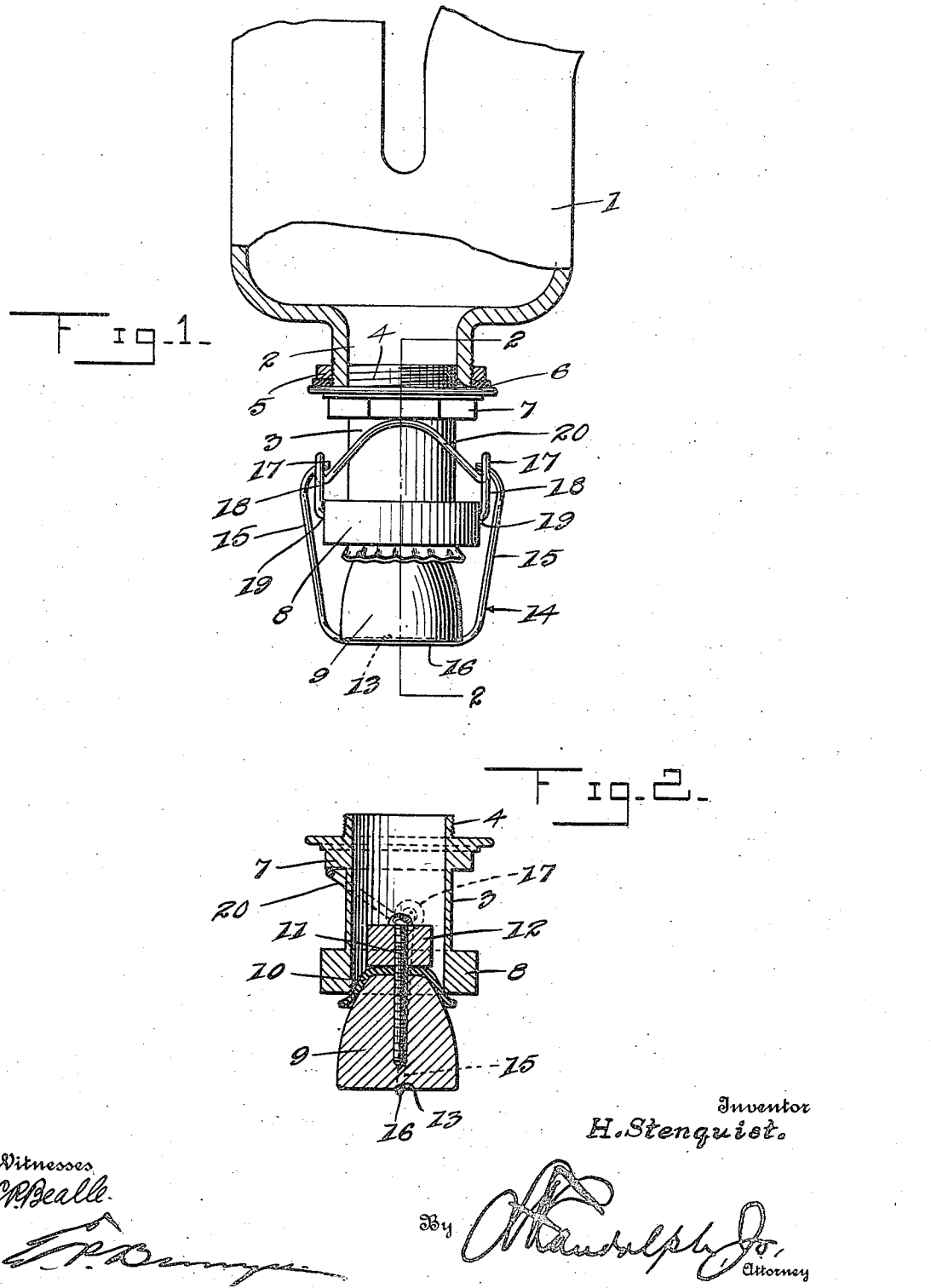

UNITED STATES PATENT OFFICE.

HENRY STENQUIST, OF NEW YORK, N. Y.

CLEAN-OUT PLUG.

1,194,091.  Specification of Letters Patent.  Patented Aug. 8, 1916.

Application filed April 18, 1914. Serial No. 832,867.

*To all whom it may concern:*

Be it known that I, HENRY STENQUIST, a citizen of the United States, residing at New York city, in the county of New York and State of New York, have invented certain new and useful Improvements in Clean-Out Plugs, of which the following is a specification.

This invention relates to clean out plugs for sink traps, and one of the principal objects is to provide a clean out plug for a sink trap which can be quickly operated by hand without the use of a wrench or other tool, and by an unskilled person.

Another object of the invention is to provide a plug for a sink trap comprising a plug or stopper provided with a rubber gasket, said plug being fitted within a short section of pipe connected to the outlet nozzle of a sink trap, said plug being held in place by means of a wire bail or yoke and an eccentric lever.

These and other objects may be attained by means of the construction illustrated in the accompanying drawings, in which:

Figure 1 is a side elevation of a clean-out plug fitted to the outlet nozzle of the sink trap, the latter being shown partially in section. Fig. 2 is a vertical sectional view taken on the line 2—2 of Fig. 1.

Referring to the drawings the numeral 1 designates a sink trap and 2 is the discharge nozzle of the same. As usually constructed a threaded plug is fitted in this nozzle and a wrench is required to remove the plug for cleaning out the trap. This invention proposes to improve the construction referred to by providing means whereby the plug may be quickly operated by hand and without the use of tools.

In carrying out the invention a short section of pipe 3 provided with screw threads 4 upon its upper end is connected to the nozzle 2 by means of a threaded nut 5, and a washer 6, which is seated upon a cap nut 7 connected to the tube 3. At the lower end the pipe section 3 is provided with an enlarged plain bead 8. A plug or stopper 9 having a rubber or other compressible gasket 10 connected thereto by means of a screw 11 which extends through a bearing block or disk 12 of wood or other suitable material. The plug or stopper 9 may also be formed of wood or similar material, and may be provided with a groove 13 extending across the outer face thereof. A wire bail 14 comprises the side arms 15 and the cross bar 16. The arms 15 are connected at their ends in eyes 17 formed upon a lever comprising two members 18 having inwardly turned pivotal ends 19 seated in openings in the bead 8 and permitted to have a pivotal movement. The hand-hold 20 for operating the lever may be moved outward from the side of the pipe section 3 to release the bail 14 from the stopper or plug, and when the hand-hold 20 is pushed down into the position shown in Fig. 1 the stopper or plug 9 will be held firmly seated in the outer end of the pipe section 3.

From the foregoing it will be obvious that a clean out plug made in accordance with this invention can be used in connection with sinks or washstands, can be quickly operated, by hand whenever it is desired to clean out the trap, can be manufactured at low cost, and is reliable and efficient for its purpose.

Various changes may be made in the details of construction without departing from the spirit and scope of the invention as defined in the claim.

What is claimed is:

A clean out plug for sinks comprising a short pipe section connected to the discharge nozzle of a sink trap, a tapered valve having its upper smaller end extending into the lower end of the pipe section, said valve having lower and upper flat faces, said lower face having a groove, a compressible gasket mounted upon said upper flat face and extending downwardly in contact with the side of the valve to a point below the lower end of the pipe section, a bearing block positioned upon the gasket directly above said upper flat face, a bolt extending centrally through the bearing block and through the gasket, said bolt extending into the valve to a point adjacent said lower flat face thereof and alining vertically with said groove, a bail having a horizontal portion longer than the diameter of the valve and seated in said groove, said bail also having arms secured to the ends of the horizontal portion, and means connected to the pipe section and said arms by which the bail may be moved upwardly to seat the valve, the valve when seated clamping the gasket between its side walls and the pipe section.

In testimony whereof I affix my signature in presence of two witnesses.

HENRY STENQUIST.

Witnesses:
 ERIC ALM,
 HARRY BACKSTRAN.